UNITED STATES PATENT OFFICE.

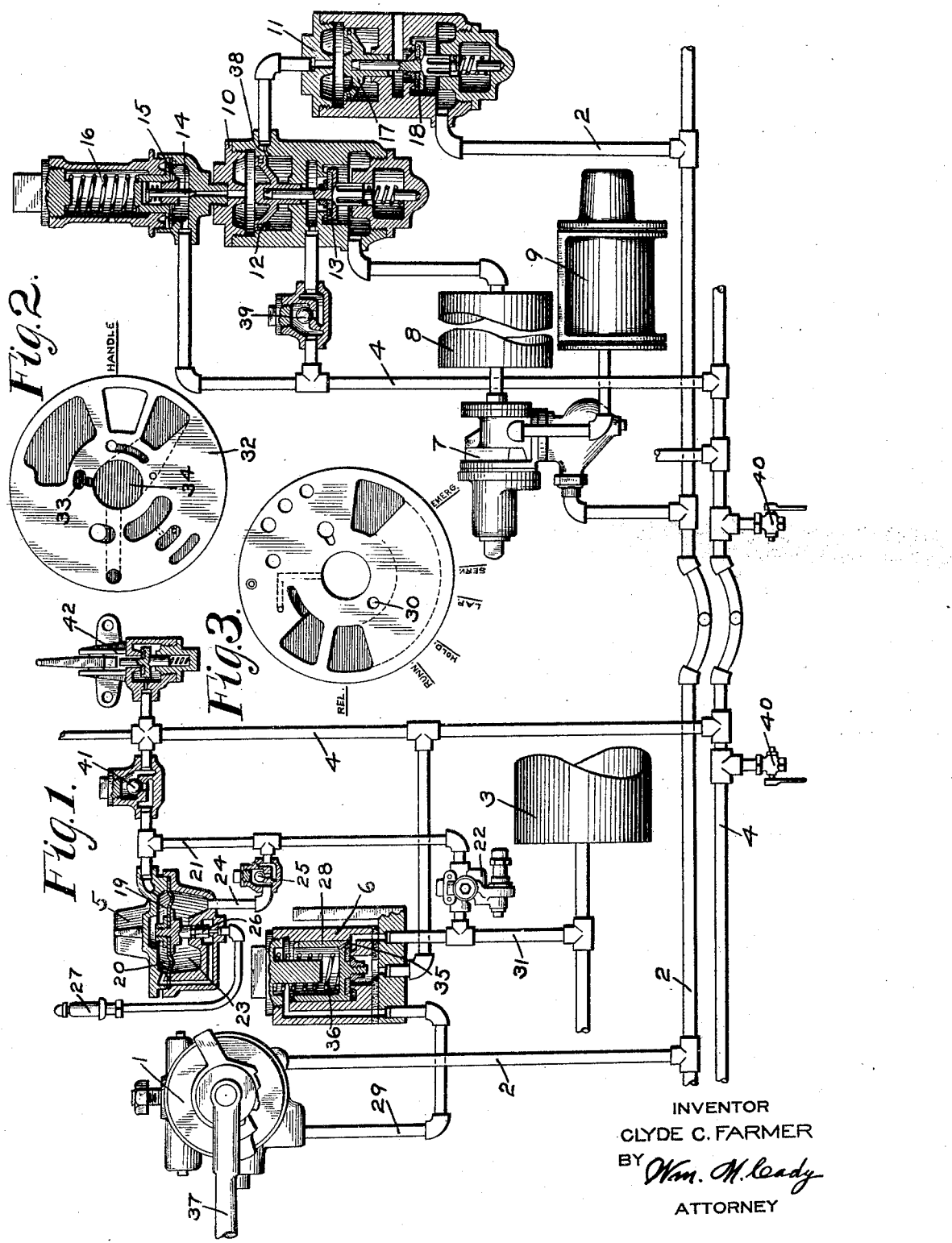

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

DOUBLE-CONTROL BRAKE EQUIPMENT.

1,411,688.　　　　Specification of Letters Patent.　　Patented Apr. 4, 1922.

Application filed April 8, 1920. Serial No. 372,117.

*To all whom it may concern:*

Be it known that I, CLYDE C. FARMER, a citizen of the United States, residing at Edgewood, in the county of Allegheny and State of Pennsylvania, have invented new and useful Improvements in Double-Control Brake Equipments, of which the following is a specification.

This invention relates to fluid pressure brakes, and more particularly to a safety system of the character covered by Patent No. 1,083,351 of S. G. Down, dated January 6, 1914.

The principal object of my invention is to provide an improved safety brake control system of the above character.

In the accompanying drawing, Fig. 1 is a diagrammatic view, partly in section, of a safety brake control system embodying my invention; Fig. 2 a face view of the rotary valve of the brake valve device; and Fig. 3 a plan view of the rotary valve seat.

As in the above mentioned patent, the system comprises the usual automatic fluid pressure brake equipment, and in addition, means operated by increasing the signal line pressure above normal for venting fluid from the brake pipe to effect an emergency application of the brakes, so that in case an angle cock in the brake pipe should be accidentally closed, the brakes may still be applied in the above manner.

According to the present invention, the signal line pressure is automatically increased by the movement of the usual brake valve device to emergency application position, so that even if the engineer is not aware that an angle cock has been closed, a brake application will still be obtained by the movement of the brake valve device as above indicated.

Another feature of my invention consists in providing means operated upon an increase in signal line pressure above normal for serially increasing the signal line pressure throughout the train.

As shown in the drawing, the equipment on the locomotive may comprise a brake valve device 1, connected to the brake pipe 2, a main reservoir 3, a signal pipe 4, a signal valve device 5, and a relay valve device 6.

On each car there is provided the usual brake equipment comprising a triple valve device 7, an auxiliary reservoir 8, and a brake cylinder 9. In addition, a valve device 10 is provided, which is adapted to be controlled by the pressure in the signal line for operating a vent valve device 11 to effect a local reduction in brake pipe pressure.

The valve device 10 may comprise a casing containing a piston 12 for operating a valve 13 and for controlling the admission of fluid under pressure from the signal line 4 to the vent valve device 11.

Communication from the signal line 4 to the piston 12 is controlled by a valve 14 which is operated by a diaphragm 15, subject on one side to the pressure of an adjustable spring 16 and on the opposite side to the pressure in the signal line 4.

The vent valve device 11 may comprise a casing containing a piston 17 and a vent valve 18 adapted to be operated by said piston for venting fluid from the brake pipe 2.

The signal valve device 5 on the locomotive may comprise a casing containing a movable diaphragm 19, the chamber 20 on one side of which is connected to a pipe 21 through which fluid under pressure is supplied at a reduced pressure according to the setting of the pressure reducing valve device 22.

The chamber 23 at the opposite side of the diaphragm 19 is connected to supply pipe 21 through a pipe 24 containing a check valve 25, and the diaphragm is adapted to operate a valve 26 for controlling the supply of air to the usual whistle 27.

The relay valve device 6 may comprise a casing containing a valve piston 28 having one side connected by pipe 29 to a port 30 in the seat of the rotary valve of the brake valve device 1 and the other side connected to the main reservoir pipe 31. The rotary valve 32 of the brake valve device 1 is provided with an additional cavity 33, leading to the central cavity 34, and adapted in emergency position of the rotary valve to connect the port 30 with the atmosphere.

In operation, the fluid pressure brake system is charged up in the usual manner and the port 30 being blanked in all positions of the rotary valve 32 except emergency position, fluid under pressure equalizes through port 35 in the piston valve 28 from the main reservoir pipe 31, permitting the spring 36 to hold the valve piston 28 seated.

If the brake valve handle 37 is turned to emergency application position, the pressure in the brake pipe 2 will be reduced in the usual manner and in addition, the cavity 33 will register with port 30, so that fluid is vented from the spring side of the valve piston 28 and said valve piston is then lifted from its seat by main reservoir pressure, so as to open communication for supplying fluid at main reservoir pressure to the signal pipe line 4.

The pressure in the signal pipe line is thus raised above normal and acts upon the diaphragm 15 of the valve device 10 on each car of the train. The resistance of spring 16 being overcome by the increase in signal line pressure above normal, the valve 14 is lifted from its seat by the diaphragm 15 and fluid under pressure is admitted from the signal pipe 4 to the chamber above the piston 12. Said piston is then actuated to open the port 38, so that signal line pressure is admitted to piston 17. The piston 17 thereupon actuates the valve 18, so as to open communication for venting fluid from the brake pipe 2.

The reduction in brake pipe pressure thus produced causes the operation of the triple valve device on each car to effect an emergency application of the brakes.

The movement of piston 12 also opens the valve 13, so that fluid under pressure is admitted from the auxiliary reservoir 8 past the check valve 39 to the signal line and thus a local increase in signal line pressure is produced which facilitates the quick serial action of the apparatus throughout the train, as will be evident.

It will now be seen that in case an angle cock should be accidentally closed at any point in the brake pipe, so as to prevent the usual action of the brake apparatus, then the brakes will still be applied in emergency as before described. If the angle cocks are all open in the usual manner, then the emergency application of the brakes will be effected by the reduction in brake pipe pressure as heretofore.

In order to prevent the accidental closing of an angle cock in the signal line, it is proposed to dispense with same and instead provide vent cocks 40 in the signal line adjacent to each end of the car.

If it is desired to cut the train at any point, the vent cocks 40 adjacent to the cut may be turned to release the pressure in the hose so that the hose couplings may be easily and safely separated.

However, the sudden change in pressure in the signal pipe might be violent enough to effect the diaphragm of the signal valve device 5 as ordinarily connected and in order to avoid this, a by pass connection is introduced containing the check valve 25, so that the pressure will be increased in the chamber 23 as rapidly as it is increased in the chamber 20, thus preventing the creation of any differential pressure which would tend to rupture the diaphragm.

A check valve 41 is interposed in the pipe connection from the signal line 4 to the chamber 20 of the signal valve device, so that an increase in pressure in the signal line above normal will not be transmitted to the diaphragm 19.

If a signal line vent cock 40 should be accidentally left open this will be made apparent to the engineer by the signal pressure gage on the locomotive or by the blowing of the signal whistle.

If the engineer should attempt to make a service application of the brakes with the angle cock closed immediately behind the tender, a service application would be obtained only on the locomotive, but as soon as the engineer notes this, he can turn the brake valve to emergency position and cause an emergency application of the brakes throughout the train by the increase in signal line pressure as heretofore described.

For operating the signal valve device for signaling, the usual signal discharge valve 42 is provided on each car.

A dummy coupling of the usual construction is provided for for closing the live end of the signal pipe after a train is cut and thus serves the purpose of the usual angle cock.

Having now described my invention, what I claim as new and desire to secure by Letters Patent, is:—

1. The combination with a brake pipe, a fluid pressure brake operated upon a reduction in brake pipe pressure for effecting an application of the brakes, and a brake valve device for effecting a reduction in brake pipe pressure, of an additional train pipe line and means operated upon an increase in pressure in said train pipe line for effecting a reduction in brake pipe pressure, said brake valve device being adapted to effect an increase in pressure in the train pipe line.

2. The combination with a brake pipe, a fluid pressure brake operated upon a reduction in brake pipe pressure for effecting an application of the brakes, and a brake valve device for effecting a reduction in brake pipe pressure, of a signal pipe line and means on each car operated upon an increase in signal line pressure above normal for effecting a reduction in brake pipe pressure, said brake valve device having ports adapted in emergency position to effect an increase in pressure in the signal pipe line.

3. The combination with a brake pipe, a fluid pressure brake operated upon a reduction in brake pipe pressure for effecting an application of the brakes, and a brake valve device for effecting a reduction in brake pipe pressure, of a signal pipe line normally charged with fluid under pressure, means on each car operated upon an increase in pressure in the signal pipe line above normal for venting fluid from the brake pipe, and a valve device operated upon movement of the brake valve device to emergency position for supplying fluid at a pressure above normal to the signal pipe line.

4. The combination with a brake pipe and a train signal pipe, of a vent valve device operated by fluid under pressure for venting fluid from the brake pipe to effect an application of the brakes and a valve device operated upon an increase in pressure in the train signal pipe for varying the fluid pressure on said vent valve device.

5. The combination with a brake pipe and a train signal pipe, of a vent valve device operated by fluid under pressure for venting fluid from the brake pipe to effect an application of the brakes, a source of fluid under pressure, and a piston and valve operated upon an increase in pressure in the train signal pipe for supplying fluid under pressure from said source to the signal pipe and from the train signal pipe to said vent valve device.

6. The combination with a train signal pipe normally containing fluid under pressure and a source of fluid under pressure, of a valve device operated upon an increase in pressure in the signal pipe above normal for supplying fluid from said source to said pipe.

7. The combination with a train signal pipe normally containing fluid under pressure and a train brake pipe, of a vent valve device for venting fluid from the train brake pipe to effect an application of the brakes, a source of fluid under pressure, and means operated upon an increase in train signal pipe pressure for supplying fluid from said source to the signal pipe and from the signal pipe to said vent valve device.

8. The combination with a train signal pipe normally containing fluid under pressure and a train brake pipe, of a vent valve device for venting fluid from the train brake pipe to effect an application of the brakes, a source of fluid under pressure, a valve for controlling communication from said source to the signal pipe, a piston operated by fluid under pressure for opening said valve and for supplying fluid to operate said vent valve device, and a valve operated upon an increase in signal pipe pressure above normal for supplying fluid from the signal pipe to said piston.

9. The combination with a train signal pipe and a train brake pipe, of a brake valve device and a relay valve device operated upon movement of the brake valve device to emergency position for effecting an increase in signal pipe pressure, and means operated upon an increase in signal pipe pressure for effecting a reduction in train brake pipe pressure.

10. The combination with a train signal pipe and a train brake pipe, of a brake valve device and a relay valve device on the locomotive operated upon movement of the brake valve device to emergency position for effecting an increase in signal pipe pressure and means on each car of the train operated upon an increase in train signal pipe pressure for effecting a reduction in brake pipe pressure.

In testimony whereof I have hereunto set my hand.

CLYDE C. FARMER.